United States Patent

[11] 3,575,365

| [72] | Inventors | Reginald G. Austin;<br>John P. Gear, Yeovil, Somerset, England |
|---|---|---|
| [21] | Appl. No. | 803,302 |
| [22] | Filed | Feb. 28, 1969 |
| [45] | Patented | Apr. 20, 1971 |
| [73] | Assignee | Westland Aircraft Limited<br>Yeovil, Somerset, England |
| [32] | Priority | Mar. 14, 1968 |
| [33] | | Great Britain |
| [31] | | 12387/68 |

[54] AIRCRAFT LANDING GEAR
10 Claims, 1 Drawing Fig.

[52] U.S. Cl. .................................................. 244/102
[51] Int. Cl. ...................................................... B64c 25/18
[50] Field of Search ............................................ 244/102, 100, 101

[56] References Cited
UNITED STATES PATENTS

| 2,025,743 | 12/1935 | Hathorn ...................... | 244/102 |
| 2,481,635 | 9/1949 | Wheeler et al. ............... | 244/102 |
| 2,565,007 | 8/1951 | Van Zelm et al. ............ | 244/102 |
| 2,755,041 | 7/1956 | Lewis .......................... | 244/102 |
| 3,127,134 | 3/1964 | Sutcliffe ...................... | 244/102 |

*Primary Examiner*—Milton Buchler
*Assistant Examiner*—Paul E. Sauberer
*Attorney*—Larson, Taylor & Hinds

ABSTRACT: An aircraft landing gear providing extension or retraction in a substantially vertically rectilinear plane of movement comprises one or more ground-contacting members with pivotal support means, the support means being operably associated with at least two mechanical jacks and two intermediate arm members. Guiding members are pivotally attached each at one of its ends to an intermediate arm member and pivotally attached at its opposite end to meshing quadrant gears. The mechanical jacks and intermediate arm members are pivotally attached at one end to the aircraft structure.

Patented April 20, 1971 3,575,365
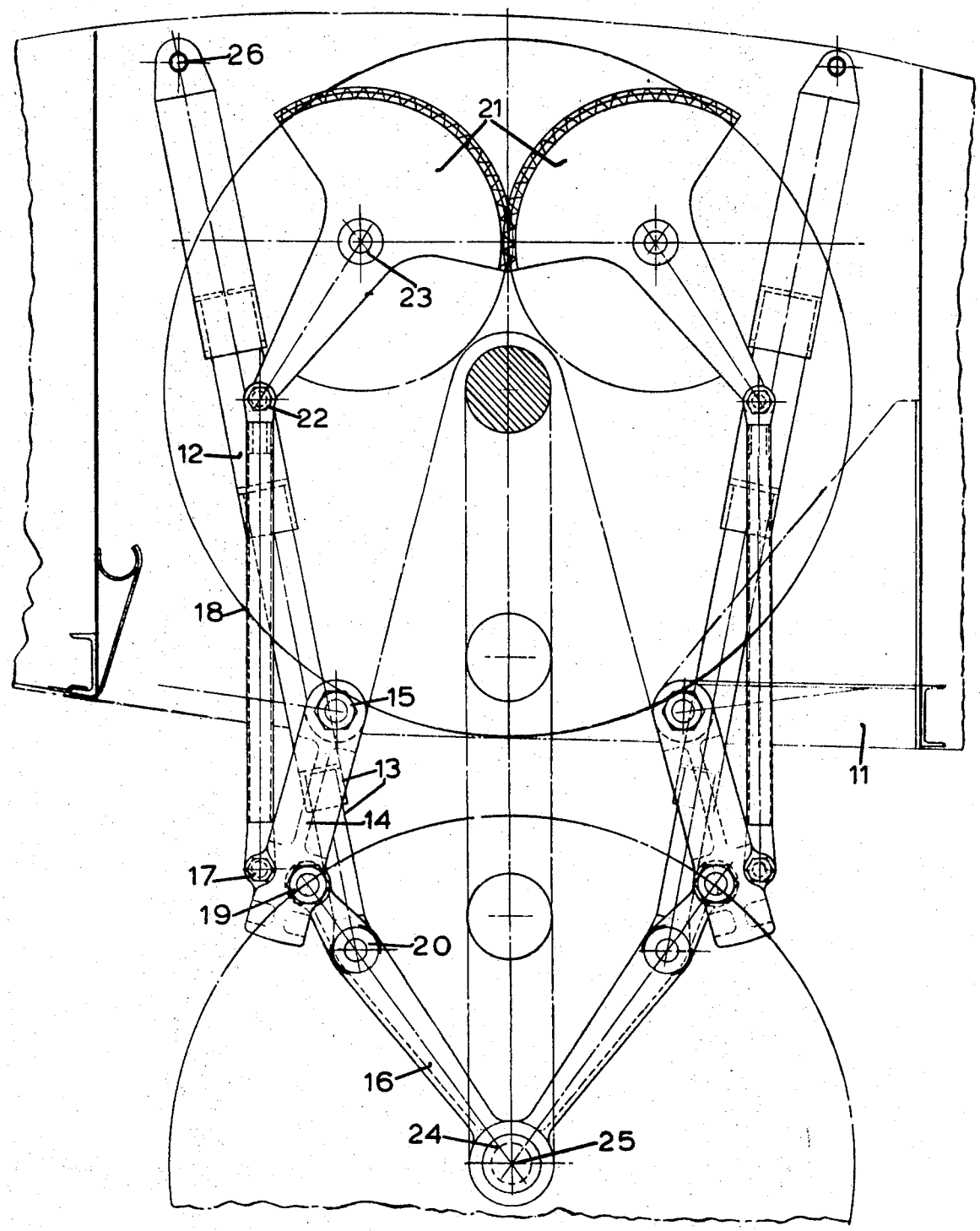

AIRCRAFT LANDING GEAR

This invention relates to retractable landing gear for aircraft especially, but not exclusively, for rotorcraft. Modern trends of convertible rotorcraft where at least two basic modes of flight are possible, namely, vertical takeoff and landing and cruise at relatively high forward speeds, make retractable landing gear at least desirable, if not essential.

Existing types of retractable landing gear possess a number of disadvantages, the chief of which is the relatively large dimensions of the stowage compartment bay which houses the landing gear when retracted, necessitating additional strengthening members to compensate for the weakening of the structure around the cutaway portion of the wing or fuselage. This feature introduces a further disadvantage of increased weight.

It is the object of the present invention to provide a retractable landing gear which operates in a rectilinear plane of movement from the fully extended position to the fully retracted position and vice versa, resulting in a small stowage compartment bay, a minimum number of additional strengthening members, and a reduction in weight.

According to the invention we provide an aircraft landing gear comprising one or more ground-contacting members, said member or members being retractable and extendable in a substantially rectilinear plane of movement.

In a preferred embodiment of the invention we provide an aircraft landing gear wherein the retraction and extension of the said ground-contacting member or members is guided by two or more members pivotally attached to one or more pairs of meshing gears, the other end of said guiding members being connected to pivotal arms pivotable about a fixed point, said pivotal arms carrying the support means for said ground-contacting member or members.

Preferably retraction and extension of the aircraft landing gear is accomplished by mechanical jacks which may be operated by fluid or electric means.

Shock absorbers or dampers are combined with the mechanical jacks but may be separate units, if so desired.

In preferred forms of the invention the meshing gears above referred to, which are part of, or associated with, the guide members, may be quadrant gears and are provided with locking means, to prevent independent movement of said gears and associated pivotal members relative to each other when said ground-contacting member or members is or are in the fully extended or fully retracted position.

One or more mechanical jacks attached to the aircraft structure and arranged to simultaneously operate the meshing gears may be substituted for the jacks attached to the pivotal arm members.

Further objects and advantages of the invention will become apparent from the following description and operation of a preferred embodiment by way of example, with reference to the accompanying DRAWING which shows a side view of the landing gear.

Referring to the FIGURE the landing gear stowage bay with cutaway portion is generally indicated at 11. The power means 12 shown by way of example in this embodiment are two section telescopic mechanical jacks with a third section 13 comprising a shock absorber or damper, the arm of which is pivotally connected to ground-contacting member support means 16 by bearings 20. One end of support member 16 is also pivotally attached to arm 14 by bearings 19, and the lower ends of said support member 16 are pivotally connected at bearings 24 associated with ground-contacting member 25. The mounting end of mechanical jacks 12 are pivotally attached to a convenient point on the aircraft structure shown at 26.

Guiding members 18 are pivotally attached by bearings 17 to arm 14, said arm 14 being connected to a fixed pivotal point 15 on the aircraft structure; the other end of guiding members 18 are pivotally connected to quadrant gears 21 (shown by way of example only) by bearings 22, said quadrant gears 21 being mounted on fixed pivotal points 23.

Mechanical jacks 12 providing the power means for retraction or extension of said landing gear may be operated by fluid or electric means.

In operation, the FIGURE shows the landing gear in the extended or landing position. Selection of landing gear RAISE will supply power to mechanical jacks 12, which in retracting will cause support members 16 to move outwardly about pivotal points 20, at the same time arms 14 will also move outwardly about pivotal points 15 with guide members 18 moving substantially vertically upwards in conjunction with quadrant gears 21, said gears rotating in opposite directions, namely, one clockwise and the other anticlockwise, such arrangement preventing fore and aft movement of ground-contacting member 25, thus ensuring a vertical rectilinear path of movement of said member to the fully retracted position.

In this position where the ground-contacting member is housed in stowage bay 11, support members 16 have moved from their V-configuration in the fully extended mode, as shown in the FIGURE, through a horizontal plane to an obtuse inverted V; likewise arms 14 have moved through an arc of movement of approximately 120° about fixed pivot point 15 with their associated guide members 18 remaining substantially vertical.

On completion of the retraction cycle, locking means (not shown) are automatically brought into operation to prevent any movement of the mechanism, such means may be associated with the quadrant gears or the mechanical jacks or both.

Selection of landing gear LOWER initiates the reverse sequence of operation, power is supplied to the mechanical jacks 12, thereby extending said jacks causing support members 16 to move downwardly about pivotal points 20, arms 14 in association with guiding members 18 and quadrant gears 21 will move downwardly, said arms 14 moving in the prescribed arc of approximately 120°, thus reversing the inverted V-configuration with ground-contacting member 25 moving in a substantially vertical downward path to the fully extended position as shown in the FIGURE, the locking means already mentioned but not shown coming into operation.

It will be appreciated that modifications may be made without departing from the scope of the invention, for instance, shock absorbers or dampers can be separate units, and may be substituted for the guide members.

Modifications to linkages, angles, and extensions of the various members comprising the landing gear may be necessary to suit certain installations.

We claim:

1. An aircraft landing gear comprising a ground-contacting member, support members each pivotally coupled to said ground-contacting member at one end and extending outwardly therefrom on opposite sides thereof, a pair of meshing gears pivotally supported by aircraft structure, a pair of guiding members, each guiding member being coupled at one end to one of said gears so as to be movable in accordance with rotation of its associated gear, means forming a pivotal coupling between the other end of each guide member and the other end of one of said support members, means defining fixed paths which said pivotal couplings must follow during movement thereof such that said ground-contacting member is restricted to movement along a predetermined separate path, and actuatable means coupled to at least one of the previously recited members for effecting retraction and extension movement of such ground-contacting member.

2. Apparatus as claimed in claim 1 wherein said means defining fixed paths comprise intermediate arm members each pivotally coupled at one end to structure of the aircraft and at the other end to one of said pivotal couplings between a guide member and a support member.

3. Apparatus as claimed in claim 2 wherein each of said guide members and each of said support members are adjacently pivotally connected at their other ends to one of said intermediate arm members to form said pivotal couplings.

4. Apparatus as claimed in claim 2 wherein said actuatable means comprise two jacks, each coupled at one end to structure of the aircraft and at the other end to one of the group consisting of a support member, an intermediate arm member, a guide member, and a gear.

5. Apparatus as claimed in claim 4 wherein each of said jacks is coupled at its said other end to one of said support members.

6. Apparatus as claimed in claim 5 wherein each of said jacks comprises at least one telescopic section for retraction and extension and at least one shock absorber section.

7. Apparatus as claimed in claim 1 wherein said gears are quadrant gears.

8. Apparatus as claimed in claim 1 wherein said ground-contacting member is restricted to rectilinear movement.

9. Apparatus as claimed in claim 2 wherein parts of the landing gear lie on opposite sides of the path of movement of the ground-contacting member, and the parts on one side are substantially a mirror image of the parts on the other side.

10. An aircraft landing gear comprising a ground-contacting member, two support members each pivotally connected to said ground-contacting member at one end, two intermediate arms each pivotally connected to structure of the aircraft at one end, the other end of each support member being pivotally connected to the other end of one of said intermediate arm members such that each grouping of an intermediate arm member and a support member forms a linkage between aircraft structure and the ground-contacting member, each linkage being pivotally connnected at one end to the aircraft structure and at the other end to the ground-contacting member and having an intermediate pivotal joint such that upon extension or retraction of the ground-contacting member relative pivotal movement occurs at each connection and each joint, actuatable means for effecting retraction or extension movement of the ground-contacting member, a pair of meshing gears carried by structure of the aircraft, and means coupled to each of said meshing gears and to each of said linkages for causing each linkage to move in a predetermined manner upon movement of the other linkage and for causing said ground-contacting member to move rectilinearly upon retraction or extension.